(12) United States Patent
Minabe

(10) Patent No.: US 8,547,410 B2
(45) Date of Patent: Oct. 1, 2013

(54) EXPOSURE DEVICE AND IMAGE FORMING APPARATUS

(75) Inventor: Jiro Minabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 86 days.

(21) Appl. No.: 13/197,310

(22) Filed: Aug. 3, 2011

(65) Prior Publication Data

US 2012/0188327 A1  Jul. 26, 2012

(30) Foreign Application Priority Data

Jan. 26, 2011  (JP) .................................. 2011-014582

(51) Int. Cl.
*B41J 15/14* (2006.01)
*B41J 27/00* (2006.01)

(52) U.S. Cl.
USPC .......................................... 347/241; 347/256

(58) Field of Classification Search
USPC ................. 347/238, 240, 241, 244, 251–254, 347/256, 258; 359/9, 12, 14, 15, 19–27
See application file for complete search history.

(56) References Cited

U.S. PATENT DOCUMENTS

| 5,802,092 A * | 9/1998 | Endriz ........................ 372/50.23 |
| 6,798,438 B2 * | 9/2004 | Beier et al. ..................... 347/238 |

FOREIGN PATENT DOCUMENTS

| JP | A-2000-330058 | 11/2000 |
| JP | 2002046300 A * | 2/2002 |
| JP | 2007237576 A * | 9/2007 |
| JP | A-2007-237576 | 9/2007 |

\* cited by examiner

*Primary Examiner* — Hai C Pham
(74) *Attorney, Agent, or Firm* — Oliff & Berridge, PLC

(57) ABSTRACT

An exposure device includes a plurality of light emitting elements provided on a substrate, a plurality of hologram elements multiplexing-recorded in correspondence with the plurality of light emitting elements, respectively, such that, when the plurality of light emitting elements are made to emit light in the recording layer arranged on the substrate, a plurality of condensing points having light components emitted from two or more light emitting elements and condensed on one point, is formed, and a condensing point row extending in a predetermined direction is formed on the face to be exposed, and a driving unit that drives the plurality of light emitting elements, respectively.

11 Claims, 8 Drawing Sheets

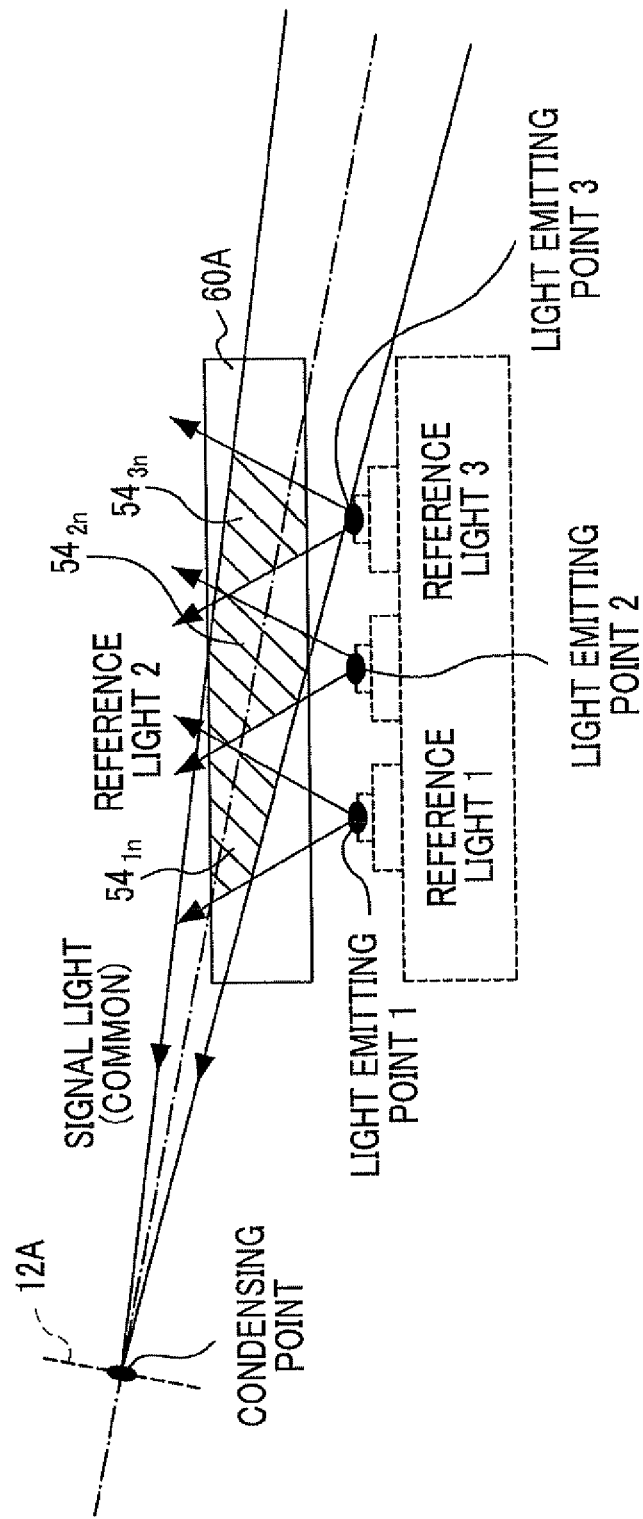

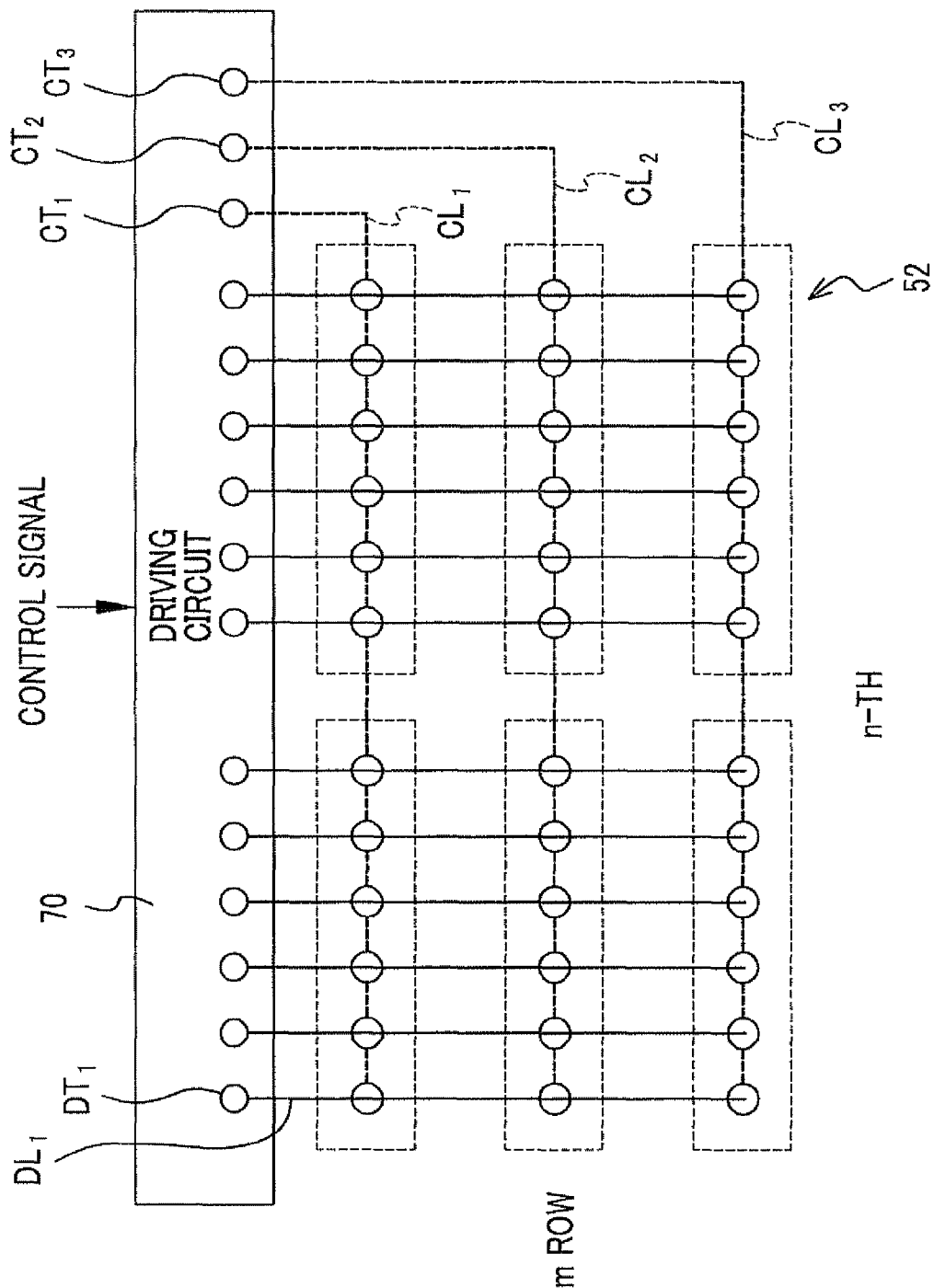

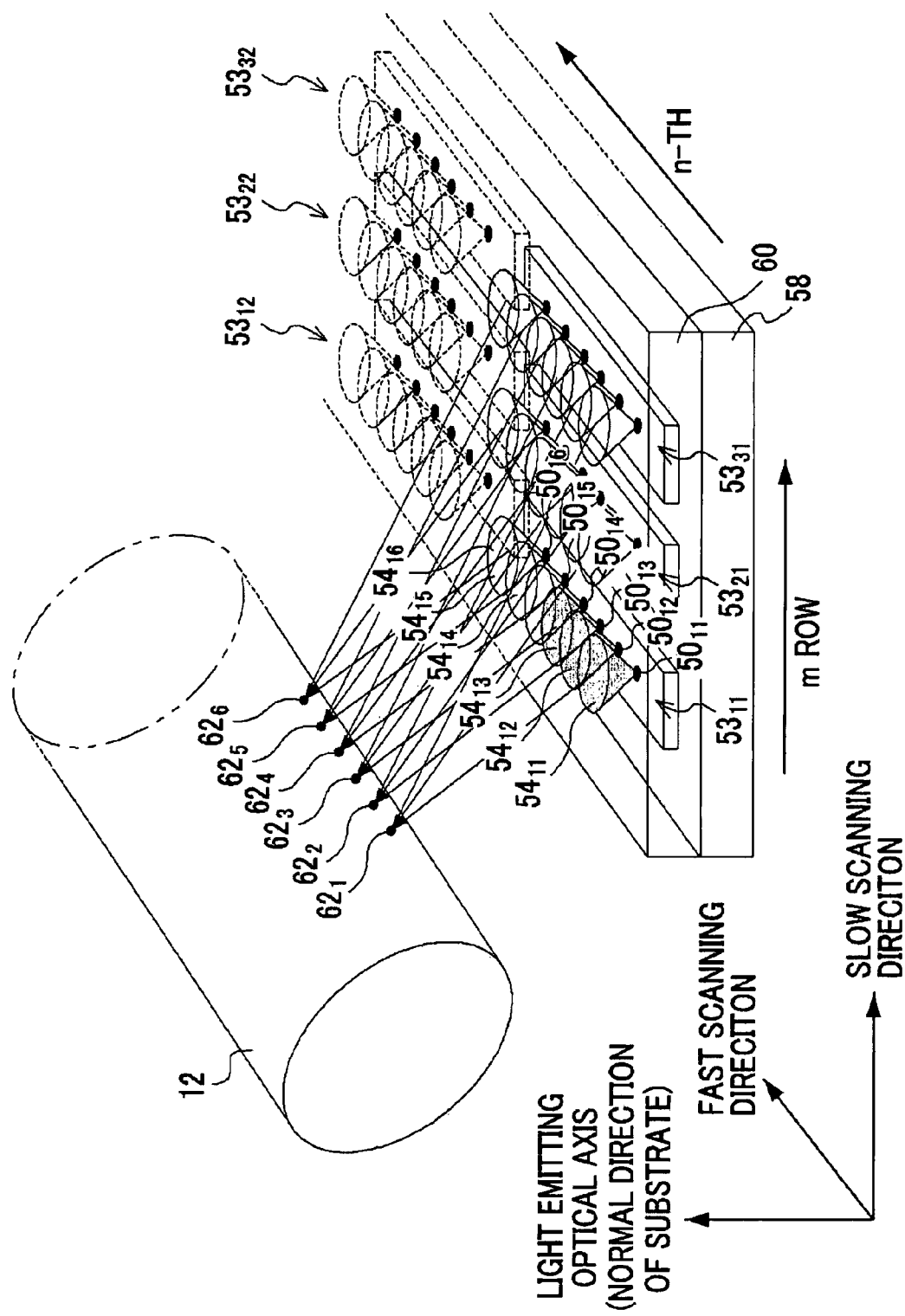

EXPOSURE DEVICE AND IMAGE FORMING APPARATUS

CROSS-REFERENCE TO RELATED APPLICATIONS

This application is based on and claims priority under 35 USC 119 from Japanese Patent Application No. 2011-014582 filed Jan. 26, 2011.

BACKGROUND

Technical Field

The present invention relates to an exposure device and an image forming apparatus.

SUMMARY

According to an aspect of the invention, there is provided an exposure device including a plurality of light emitting elements provided on a substrate; a plurality of hologram elements multiple-recorded in correspondence with the plurality of light emitting elements, respectively, such that, when the plurality of light emitting elements are made to emit light in the recording layer arranged on the substrate, a plurality of condensing points having light components emitted from two or more light emitting elements and condensed on one point, is formed, and a condensing point row extending in a predetermined direction is formed on the face to be exposed; and a driving unit that drives the plurality of light emitting elements, respectively.

BRIEF DESCRIPTION OF THE DRAWINGS

Exemplary embodiments of the present invention will be described in detail based on the following figures, wherein:

FIG. 5 is a view showing that holograms are recorded with common signal light;

FIG. 7 is a plan view showing an example of wiring corresponding to independent driving; and FIG. 8 is a schematic perspective view showing an example of the configuration of an LED print head related to the exemplary embodiment of the invention.

DETAILED DESCRIPTION

Hereinafter, an example of an exemplary embodiment of the invention will be described in detail with reference to the drawings.

<Image Forming Apparatus>

Figure 1:
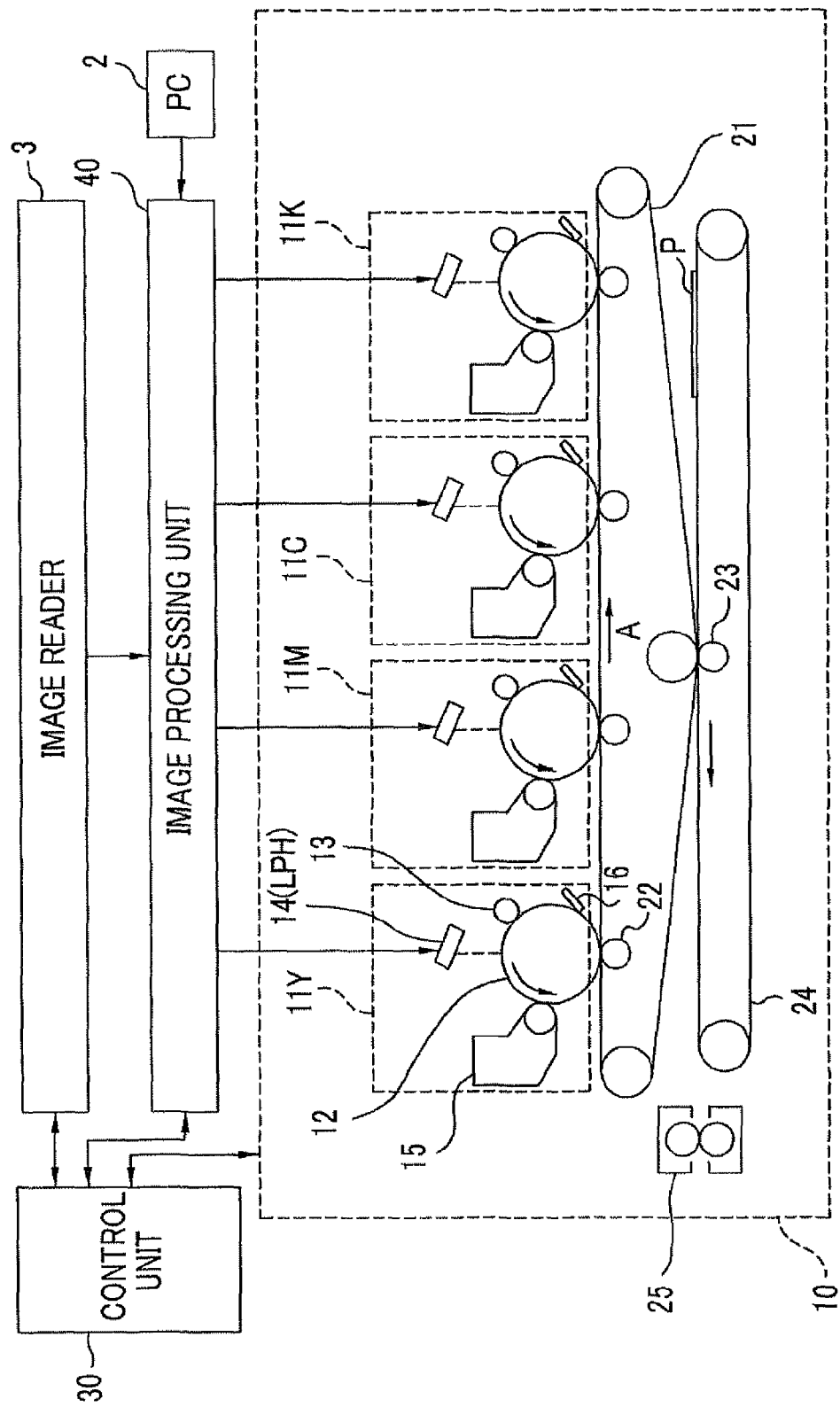
FIG. 1 is a schematic view showing an example of the configuration of an image forming apparatus related to an exemplary embodiment of the invention.

FIG. 1 is a schematic view showing an example of the configuration of an image forming apparatus related to the exemplary embodiment of the invention. This apparatus is an image forming apparatus that forms an image by an electrophotographic system, and mounts an exposure device (an LED print head, abbreviated as "LPH") of an LED printer using a light emitting diode (LED) as a light source. The LED print head has the advantage that mechanical driving is unnecessary. This image forming apparatus is a so-called tandem digital color printer, and includes an image forming processing unit 10 serving as an image forming part that performs image formation in correspondence with image data of respective colors, a control unit 30 that controls the operation of the image forming apparatus, and an image processing unit 40 that is connected to an image reader 3 and external devices, such as a personal computer (PC) 2, and performs predetermined image processing on the image data received from these devices.

The image forming processing unit 10 is equipped with four image forming units 11Y, 11M, 11C, and 11K that are arranged in parallel at regular intervals. The image forming units 11Y, 11M, 11C, and 11K form yellow (Y), magenta (M), cyan (C), and black (K) toner images, respectively. In addition, the image forming units 11Y, 11M, 11C, and 11K are appropriately and collectively referred to as the "image forming unit 11".

Each image forming unit 11 is equipped with a photoreceptor drum 12 serving as an image carrier that forms an electrostatic latent image to hold a toner image, a charger 13 that charges the surface of the photoreceptor drum 12 uniformly with predetermined potential, a LED print head (LPH) 14 serving as an exposing device that exposes the photoreceptor drum 12 charged by the charger 13, a developing device 17 that develops the electrostatic latent image obtained by the LPH 14, and a cleaner 16 that cleans the surface of the photoreceptor drum 12 after transfer.

The related-art LPH is composed of an LED array and a rod lens array. A gradient index rod lens, such as Selfoc®, has been used for the rod lens array. The light emitted from each LED is condensed by the rod lens, and an erect equal magnification image is formed on the photoreceptor drum. The image forming apparatus related to the present exemplary embodiment is equipped with an LPH using a "hologram element" instead of the "rod lens".

The LPH 14 is a long print head with almost the same length as the length of the photoreceptor drum 12 in the direction of the axis thereof. A plurality of LED is arranged in an array (row) along the length direction in the LPH 14. The LPH 14 is arranged around the photoreceptor drum 12 such that the length direction thereof is directed to the axis direction of the photoreceptor drum 12. In an LPH using a rod lens, the optical path length (operating distance) from a lens array end face to an imaging point is short, and the occupancy rate of the exposure device around a photoreceptor drum becomes large. In contrast, the LPH 14 of the present exemplary embodiment has an operating distance with a length of several millimeters to several centimeters, and is arranged so as to be separated from the surface of the photoreceptor drum 12 by this distance. For this reason, the occupancy width of the photoreceptor drum 12 in the circumferential direction thereof is small, and congestion around the photoreceptor drum 12 is eased.

Additionally, the image forming processing unit 10 is equipped with an intermediate transfer belt 21 onto which respective color toner image formed on the photoreceptor drums 12 of the respective image forming units 11 are multitransferred, a primary transfer roller 22 that sequentially transfers (primarily transfers) the respective color toner images of the respective image forming units 11 to the intermediate transfer belt 21, a secondary transfer roller 23 that collectively transfers (secondarily transfers) the superimposed toner images transferred onto the intermediate transfer belt 21 to the paper P that is a recording medium, and a fixing device 25 that fixes the secondarily transferred images on the paper P.

Next, the operation of the above image forming apparatus will be described.

First, the image forming processing unit 10 performs an image formation operation on the basis of control signals, such as a synchronizing signal supplied from the control unit 30. In such a case, the image data input from the image reader 3 or PC 2 is subjected to image processing by the image processing unit 40, and is supplied to each image forming unit 11 via an interface.

For example, in the image forming unit 11Y for yellow, the surface of the photoreceptor drum 12 uniformly charged with predetermined potential by the charger 13 is exposed by the LPH 14 that emits light on the basis of the image data obtained from the image processing unit 40, and an electrostatic latent image is formed on the photoreceptor drum 12. That is, the surface of the photoreceptor drum 12 is fast scanned as each LED of the LPH 14 emits light on the basis of image data, and the surface of the photoreceptor drum is slowly scanned as the photoreceptor drum 12 rotates, whereby an electrostatic latent image is formed on the photoreceptor drum 12. The formed electrostatic latent image is developed by the developing device 17, and a yellow toner image is formed on the photoreceptor drum 12. Similarly, in the image forming units 11M, 110, and 11K, magenta, cyan, and black toner images are formed, respectively.

The respective color toner images formed in the respective image forming units 11 are electrostatically attracted sequentially and transferred (primarily transferred) by the primary transfer roller 22, onto the intermediate transfer belt 21 that operates to rotate in the direction of an arrow A of FIG. 1. The superimposed toner images are formed on the intermediate transfer belt 21. The superimposed toner images are conveyed to a region (secondary transfer unit) in which the secondary transfer roller 23 is disposed with the movement of the intermediate transfer belt 21. When the superimposed toner images are conveyed to the secondary transfer unit, the paper P is supplied to the secondary transfer unit at the timing when a toner image is conveyed to the secondary transfer unit.

Then, the superimposed toner images are collectively and electrostatically transferred (secondarily transferred) onto the conveyed paper P by a transfer electric field formed by the secondary transfer roller 23 in the secondary transfer unit. The paper P on which the superimposed toner images have been electrostatically transferred is peeled off from the intermediate transfer belt 21, and is conveyed to the fixing device 25 by the conveying belt 24. The unfixed toner image on the paper P conveyed to the fixing device 25 is fixed on the paper P in response to the fixing processing caused by heat and pressure by the fixing device 25. Then, the paper P on which the fixing image has been formed is ejected to a paper ejection tray (not shown) provided at an ejection unit of the image forming apparatus.

<LED Print Head (LPH)>

Figure 2:
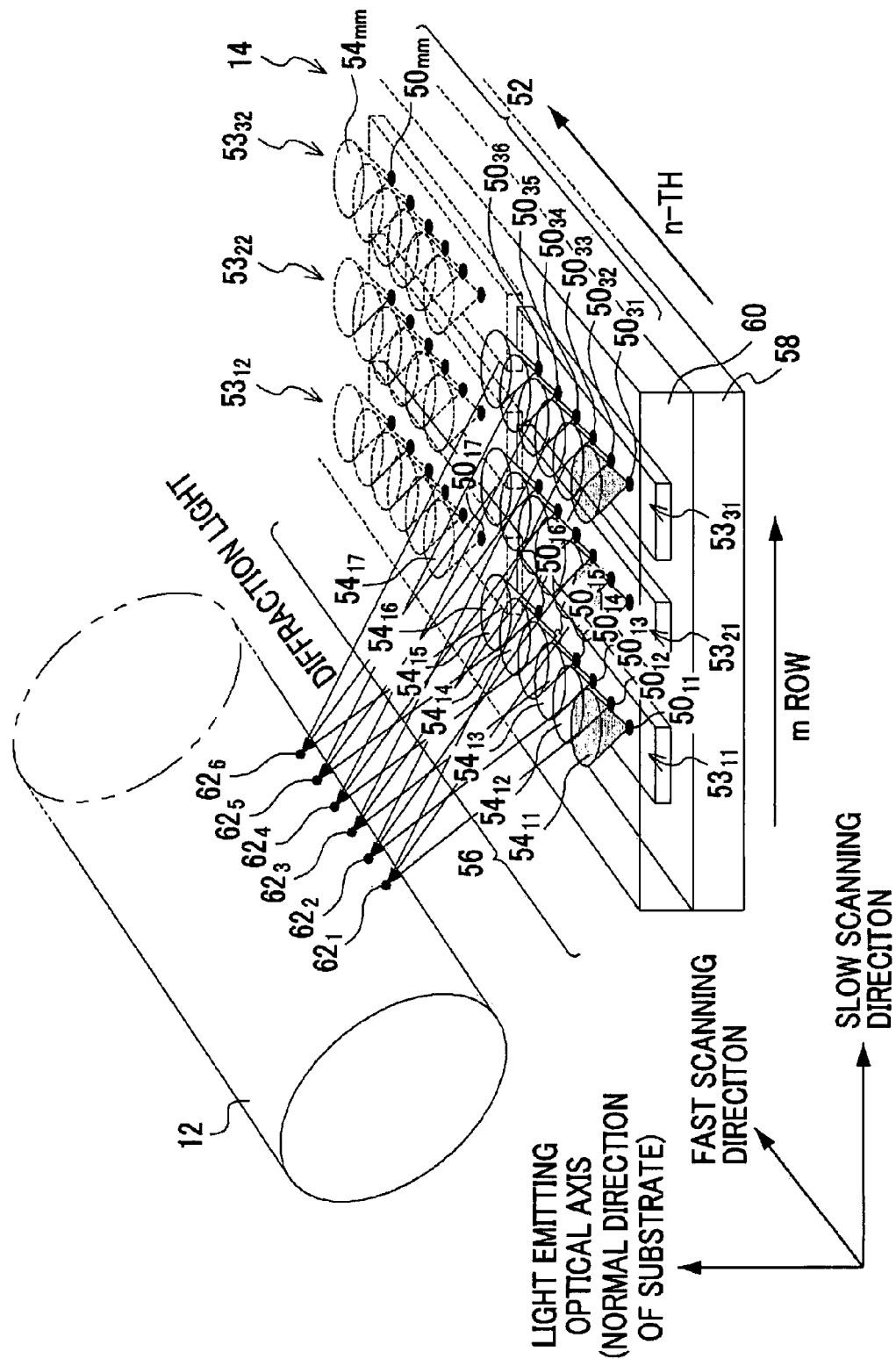
FIG. 2 is a schematic perspective view showing an example of the configuration of an LED print head related to the exemplary embodiment of the invention.

FIG. 2 is a schematic perspective view showing an example of the configuration of the LED print head serving as an exposure device related to the present exemplary embodiment. As shown in FIG. 2, the LED print head (LPH 14) is equipped with an LED array 52 in which plural LEDs 50 are two-dimensionally arranged, and a hologram element array 56 equipped with plural hologram elements 54 provided so as to correspond to the plural LEDs 50, respectively.

The plural LEDs 50 are divided into plural rows (m rows) in the slow scanning direction, and are arranged so as to be aligned as plural pieces (n pieces) in the fast scanning direction. In the example shown in FIG. 2, the plural LEDs 50 are divided into three rows in the slow scanning direction, and are arranged so as to be aligned as plural pieces in the fast scanning direction. An n-th LED 50 in an m row is indicated as an "LED $50_{mn}$". Similarly, an n-th hologram element 54 in an m row is indicated as a "hologram element $54_{mn}$".

In FIG. 2, thirty six LEDs $50_{11}$ to $50_{66}$ are shown as the LED array 52, and thirty six hologram elements $54_{11}$ to $54_{66}$ are shown as the hologram element array 56. In addition, when the LEDs and the hologram elements do not need to be distinguished, respectively, the LEDs $50_{11}$ to $50_{66}$ are generically referred to as the "LEDs 50", and the hologram elements $54_{11}$ to $54_{66}$ are generically referred to as the "hologram elements 54".

The plural LEDs 50 are arranged so as to be divided into plural LED chips 53. The plural LEDs 50 are arranged in each of the LED chips 53. In the example shown in FIG. 2, LED chips 53 in which six LEDs 50 are arranged are divided into three rows in the slow scanning direction, and are arranged so as to be aligned as plural pieces in the fast scanning direction. An n-th LED chip 53 in an m row is indicated as an "LED chip $53_{mn}$". In FIG. 2, six LED chips $53_{11}$ to $53_{32}$ are shown. In addition, when the LED chips do not need to be distinguished, respectively, the LED chips $53_{11}$ to $53_{32}$ are generically referred to as "the LED chip 53".

The plural LED chips 53 are mounted on a long LED substrate 58 with a driving circuit (not shown) that drives the LEDs 50, respectively. The LED chips 53 are arranged on the LED substrate 58 such that the plural LEDs 50 are positioned and aligned in the fast scanning direction. Thereby, the LEDs 50 are respectively arranged along a direction parallel to the axis direction of the photoreceptor drum 12.

The arrangement direction of the LEDs 50 is the "fast scanning direction". Additionally, the LEDs 50 are respectively arranged such that the interval (light emitting point pitch) in the fast scanning direction between two mutually adjacent LEDs 50 (light emitting points) becomes a regular interval. Additionally, although slow scanning is performed by the rotation of the photoreceptor drum 12, the direction orthogonal to the "fast scanning direction" is shown as the "slow scanning direction". Additionally, in the following, the positions where the LEDs 50 are arranged are appropriately referred to as the "light emitting points".

The plural LEDs 50 are respectively arranged on the LED chip 53 with their light emitting faces directed to the hologram elements 54 side so as to emit light to the corresponding hologram elements 54 side. The "light emitting optical axis" of an LED 50 intersects a corresponding hologram element 54, and is directed to a direction (normal direction) orthogonal to the LED chip 53 and the LED substrate 58. As shown in the drawing, the light emitting optical axis is orthogonal to the fast scanning direction and the slow scanning direction, respectively.

In addition, in FIG. 2, the partial structure of the LPH 14 in which six LED chips 53 are arranged is only shown schematically. As will be described below, in an actual image forming apparatus, thousands of LEDs 50 are arranged by arranging hundreds of LED chips 53 according to the resolution in the fast scanning direction. Even if the plural LEDs 50 are divided into units of plural LED chips 53, the plural LEDs 50 are respectively arranged such that the interval between two mutually adjacent LEDs 50 in the fast scanning direction becomes a substantially regular interval.

For example, in order to obtain the resolution of 1200 spots per inch in an image forming apparatus capable of performing printing up to the width of A3, 14848 spots 62 are formed on the surface 12A of the photoreceptor drum 12 so as to be aligned in the fast scanning direction at intervals of 21 μm. Accordingly, 14848 SLEDs 50 are arranged on the LED substrate 58 at intervals of 21 μm.

Additionally, although the plural LED chips 53 may have a one-dimensional arrangement, it is preferable that the chips be two-dimensionally arranged. In this case, the chips may have an arrangement different from that of FIG. 2. For example, when arranged in zigzags, the plural LED chips 53 are arranged in one row so as to be aligned in the fast scanning direction, and arranged in two rows in the slow scanning direction so as to shift by a predetermined interval. Additionally, the plural LEDs 50 may be two-dimensionally arranged within the plural LED chips 53.

As the LED chip 53, an SLED chip in which plural self-scanning type LEDs (SLED: Self-scanning LED) are arranged may be used. The SLED chip performs ON/OFF of a switch by two signal lines, makes respective SLEDs emit light selectively, and makes a data line common. By using this SLED chip, the number of necessary wiring lines on a substrate can be made small.

A hologram recording layer 60 is arranged on the LED substrate 58. The hologram element array 56 is formed within the hologram recording layer 60. The LED substrate 58 and the hologram recording layer 60 do not need to come into close contact with each other, and may be separated by a predetermined distance via an air space, a transparent resin layer, or the like. For example, the hologram recording layer 60 may be held by a holding member (not shown) at a position separated from the LED substrate 58 by a predetermined height.

Plural hologram elements $54_{11}$ to $54_{66}$ corresponding to the plural LEDs $50_{11}$ to $50_{66}$ are formed along the fast scanning direction in the hologram recording layer 60. The hologram elements 54 are respectively arranged such that the interval (interval between central points) between two mutually adjacent hologram elements 54 in the fast scanning direction becomes almost the same interval as the interval between the LEDs 50 in the fast scanning direction. That is, the large-diameter hologram elements 54 are multiplexing-recorded such that two mutually adjacent hologram elements 54 overlap each other. Additionally, the plural hologram elements 54 may have mutually different shapes, respectively.

The hologram recording layer 60 is made of polymeric materials capable of recording and holding a hologram permanently. As such polymeric materials, a so-called photo-polymer may be used. The photo-polymer records a hologram using a refractive-index change caused by polymerizing a photopolymerizable monomer.

In addition, although not shown, the LPH 14 is held by a holding member, such as a housing or a holder, and is attached to a predetermined position within the image forming unit 11 shown in FIG. 1 such that the diffraction light generated with the hologram element 54 may be emitted in the direction of the photoreceptor drum 12. In addition, the LPH 14 may be configured by an adjusting part, such as an adjustable screw (not shown), so as to move in the direction of an optical axis of the diffraction light. The imaging position (focal plane) by the hologram element 54 is adjusted by an adjusting part so as to be located on the surface of the photoreceptor drum 12. Additionally, a protective layer may be formed on the hologram recording layer 60 from a cover glass, transparent resin, or the like. Adhesion of dust is prevented by the protective layer.

Additionally, the hologram recording layer 60 may be housed within the container made of glass, resin, or the like. For example, the hologram recording layer 60 may be made of hologram recording materials enclosed in the container. The hologram recording layer 60 housed within the container is easily handled. For example, even when the hologram recording layer 60 is attached to the LED substrate 58, a supporting member is provided on the back side of the container that houses the hologram recording layer 60, and the hologram recording layer 60 is installed on the LED substrate 58 such that the hologram recording layer 60 is supported at a desired position on the LED substrate 58 by the supporting member. Thereby, the hologram recording layer 60 can be arranged so as to be separated from the LED chips 53. Additionally, the container functions also as the protective layer.

<Operation of LED Print Head>

When an LED 50 is made to emit light, the light (incoherent light) emitted from the LED 50 passes through the optical path of the diffused light that is diffused to the diameter of a hologram from a light emitting point. The light emission of the LED 50 leads to almost the same situation as that where the hologram element 54 is irradiated with reference light. As shown in FIG. 2, in the LPH 14 equipped with the LED array 52 and the hologram element array 56, the light components emitted from the plural LEDs $50_{11}$ to $50_{66}$, respectively, enter any of the corresponding hologram elements $54_{11}$ to $54_{66}$. The hologram elements $54_{11}$ to $54_{66}$ diffract the light components that have entered, thereby generating diffraction light components. The respective diffraction light components generated in the hologram elements $54_{11}$ to $54_{66}$, respectively, are emitted in a direction in which the optical axes thereof make an angle θ with respect to the light emitting optical axis so as to avoid the optical paths of the diffused light components, and are condensed in the direction of the photoreceptor drum 12.

The respective diffraction light components that have been emitted are converged in the direction of the photoreceptor drum 12, thereby forming an image on the surface of the photoreceptor drum 12 arranged at a focal plane several centimeters ahead. That is, each of the plural hologram elements 54 functions as an optical member that diffracts and condenses the light emitted from the corresponding LED 50, and forms an image on the surface of the photoreceptor drum 12. The minute spots $62_1$ to $62_6$ caused by the respective diffraction light components are formed on the surface of the photoreceptor drum 12 so as to be arranged in one row in the fast scanning direction. In other words, the photoreceptor drum 12 is mainly scanned by the LPH 14. In addition, when the spots do not need to be distinguished, respectively, the spots $62_1$ to $62_6$ are generically referred to as "spots 62".

Generally, in an LPH using LEDs that emit incoherent light, coherence degrades, spot blurring (so-called chromatic aberration) occurs, and it is not easy to form minute spots. In contrast, in the LPH 14 of the present exemplary embodiment, the angle-of-incidence selectivity and wavelength selectivity of the hologram elements are high, and high diffraction efficiency is obtained. For this reason, background noise is reduced, signal light is reproduced with high precision, and clear minute spots 62 (condensing points) of an outline are formed.

In the present exemplary embodiment, three LEDs 50 aligned in the slow scanning direction are used for forming one spot 62. For example, in the example shown in FIG. 2, respective light components emitted from an LED $50_{11}$, an LED $50_{21}$, and an LED $50_{31}$, respectively, are diffracted by any of corresponding hologram element $54_{11}$, hologram element $54_{21}$, and hologram element $54_{31}$, and are condensed in the direction of the photoreceptor drum 12, thereby forming one spot $62_1$.

The spot 62 formed by the three LEDs 50 has the quantity of light of about 3 times that of the spot 62 formed by one LED 50. Although the number of LEDs 50 aligned in the slow scanning direction is not limited to three, in order to avoid enlargement of the LPH 14, about two to six LEDs are preferable. In proportion to the number of LEDs 50 that form one spot 62, the quantity of light is increased by 2 times, 3 times, 4 times, etc. On the other hand, when aligned in the slow scanning direction, it is not necessary to reduce the number of spots 62, and the resolution is maintained.

<Shape of Hologram Element>

Figure 3A:
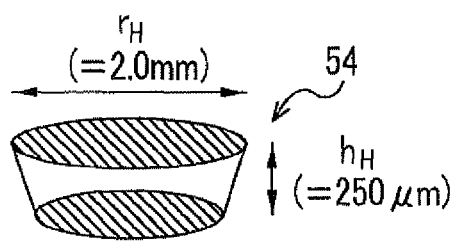
FIG. 3A is a perspective view showing the schematic shape of a hologram element.
Figure 3B:
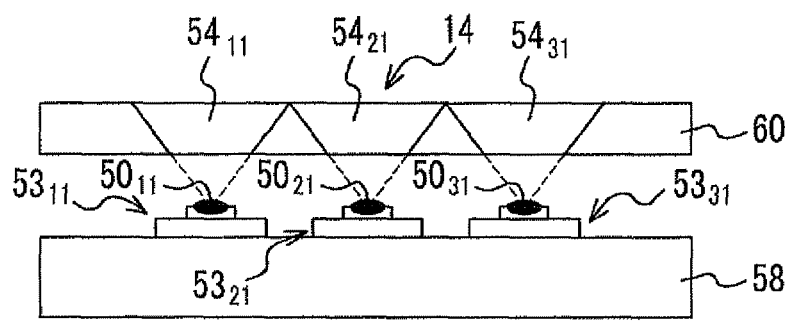
FIG. 3B is a cross-sectional view along the slow scanning direction of an LED print head.
Figure 3C:
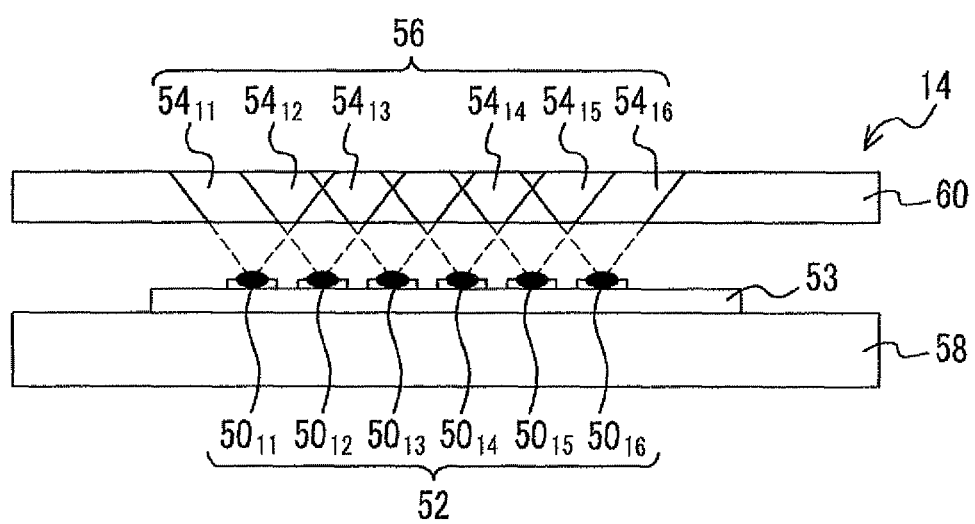
FIG. 3C is a cross-sectional view along the fast scanning direction of the LED print head.

FIG. 3A is a perspective view showing the schematic shape of a hologram element, FIG. 3B is a cross-sectional view along the slow scanning direction of an LED print head, and FIG. 3C is a cross-sectional view along the fast scanning direction of the LED print head.

As shown in FIG. 3A, each of the hologram elements 54 is a volume hologram generally referred to as a thick hologram element. Additionally, as shown in FIGS. 3A and 3B, each of the hologram elements 54 has the surface side of the hologram recording layer 60 as a bottom face, and is formed in the shape of a truncated cone that is converged toward the LED 50 side. Although the truncated-cone-shaped hologram element is described in this example, the shape of the hologram elements is not limited to this. For example, the shapes of a cone, an elliptical cone, an elliptical frustum, and the like may be used. The diameter of the truncated-cone-shaped hologram elements 54 becomes the largest at the bottom face thereof. The diameter of this circular bottom face is defined as the "hologram diameter $r_H$". In addition, the "hologram thickness $h_H$" is the thickness of the hologram elements 54.

Each of the hologram elements 54 has a larger "hologram diameter $r_H$ than the interval between the LEDs 50 in the fast scanning direction". For example, the interval between the LEDs 50 in the fast scanning direction is 30 μm, the hologram diameter $r_H$ is 2 mm, and the hologram thickness $h_H$ is 250 μm. Accordingly, as shown in FIGS. 2 and 3C, in the fast scanning direction, two mutually adjacent hologram elements 54 are formed so as to overlap each other greatly. As the resolution becomes high, the interval between two mutually adjacent LEDs 50 in the fast scanning direction becomes narrow, the interval between two mutually adjacent hologram elements 54 in the fast scanning direction becomes narrow, and the multiplicity increases. The plural hologram elements 54 are multiplexing-recorded by, for example, the spherical wave shift multiplexing. In addition, each of plural hologram elements 54 may be recorded with the same wavelength, and may be recorded by combining plural wavelengths (wavelength multiplexing).

On the other hand, as shown in FIG. 3B, in the slow scanning direction, two mutually adjacent hologram elements 54 are formed so as not to overlap each other if possible. In other words, in the slow scanning direction, the plural hologram elements 54 are recorded such that multiplexing is not performed or the multiplicity becomes low. Even if the multiplicity in the slow scanning direction is eased, the resolution does not decrease. If the multiplicity is lower, occurrence of spot blurring is suppressed, and the dynamic range of a hologram recording material is effectively used.

<Method of Recording Hologram>

Next, a method of recording holograms will be described. FIGS. 4A to 4C and FIG. 5 are views showing that the hologram elements 54 are formed in the hologram recording layer, i.e., that holograms are recorded in the hologram recording layer. Illustration of the photoreceptor drum 12 is omitted, and only the surface 12A that is an imaging surface is shown. Additionally, the hologram recording layer 60A is a recording layer before the hologram elements 54 are formed, and is distinguished from the hologram recording layer 60 in which the hologram elements 54 have been formed by adding the letter A.

In the present exemplary embodiment, three LEDs 50 aligned in the slow scanning direction are used for forming one condensing point. The light emitting points corresponding to the three LED $50_{1n}$, LED $50_{2n}$, and LED $50_{3n}$ that are aligned in the slow scanning direction are defined as a light emitting point 1, a light emitting point 2, and a light emitting point 3. The respective light components emitted from the light emitting point 1, the light emitting point 2, and the light emitting point 3, are diffracted and condensed by any of corresponding hologram element $54_{1n}$, hologram element $54_{2n}$ and hologram element $54_{3n}$, and are condensed at one condensing point on the surface 12A that is an imaging surface. In other words, the hologram element $54_{1n}$, the hologram element $54_{2n}$, and the hologram element $54_{3n}$ are respectively recorded so as to fulfill such a condensing function.

Figure 4A:
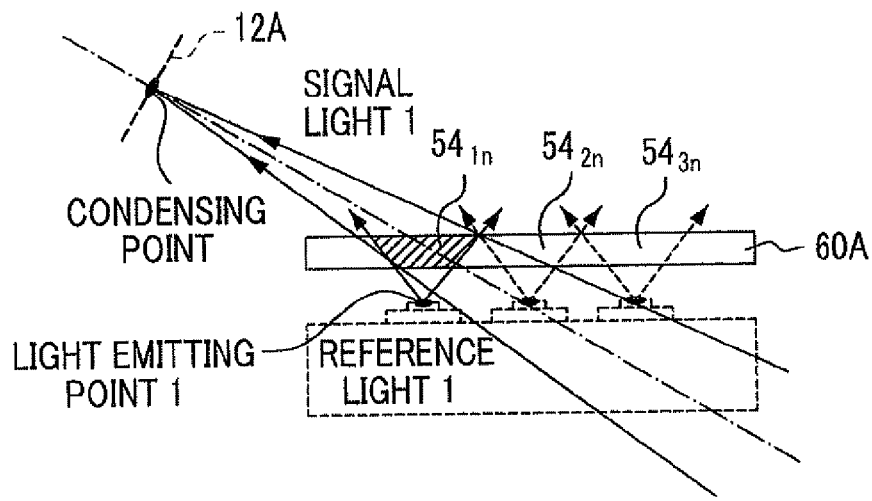
FIGS. 4A to 4C are views showing that holograms are recorded.

As shown in FIG. 4A, the coherent light that passes through the optical path of the diffraction light that is imaged on the condensing point on the surface 12A is irradiated to the hologram recording layer 60A as signal light 1. Simultaneously, when passing through the hologram recording layer 60A, the coherent light that passes through the optical path of the diffused light that is diffused from the light emitting point 1 to a desired hologram diameter $r_H$ is irradiated to the hologram recording layer 60A as reference light 1. A laser light source, such as a semiconductor laser, is used for the irradiation of the coherent light.

The signal light 1 and the reference light 1 are radiated from the same side (surface side or back side) as the hologram recording layer 60A. An interference fringe (intensity distribution) obtained by the interference between the signal light 1 and the reference light 1 is recorded in the thickness direction of the hologram recording layer 60A. Thereby, a transmissive hologram element $54_{1n}$ is recorded. The hologram element $54_{1n}$ is a volume hologram in which the intensity distribution of an interference fringe has been recorded in the planar direction and the thickness direction.

Figure 4B:
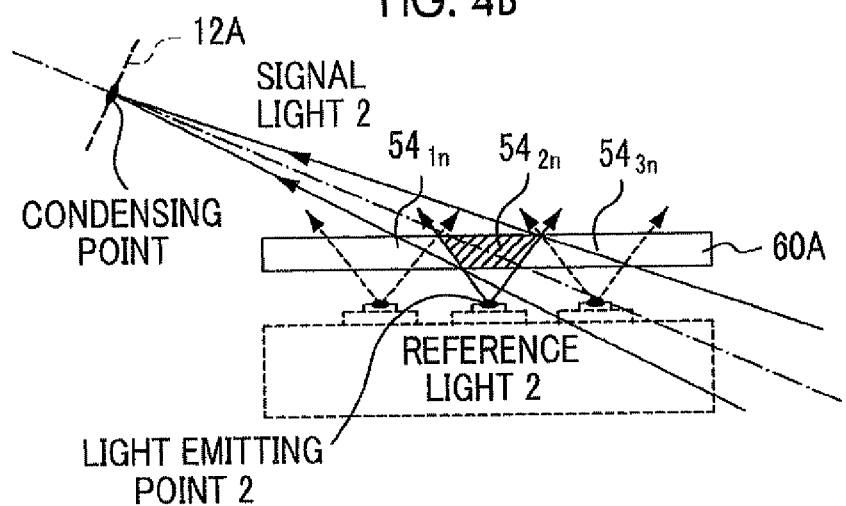

As shown in FIG. 4B, the coherent light that passes through the optical path of the diffraction light that is imaged on the condensing point on the surface 12A is irradiated to the hologram recording layer 60A as signal light 2. Simultaneously, when passing through the hologram recording layer 60A, the coherent light that passes through the optical path of the diffused light that is diffused from the light emitting point 2 to a desired hologram diameter $r_H$ is irradiated to the hologram recording layer 60A as reference light 2. A transmissive hologram element $54_{2n}$ is recorded by the interference between the signal light 2 and the reference light 2.

Figure 4C:
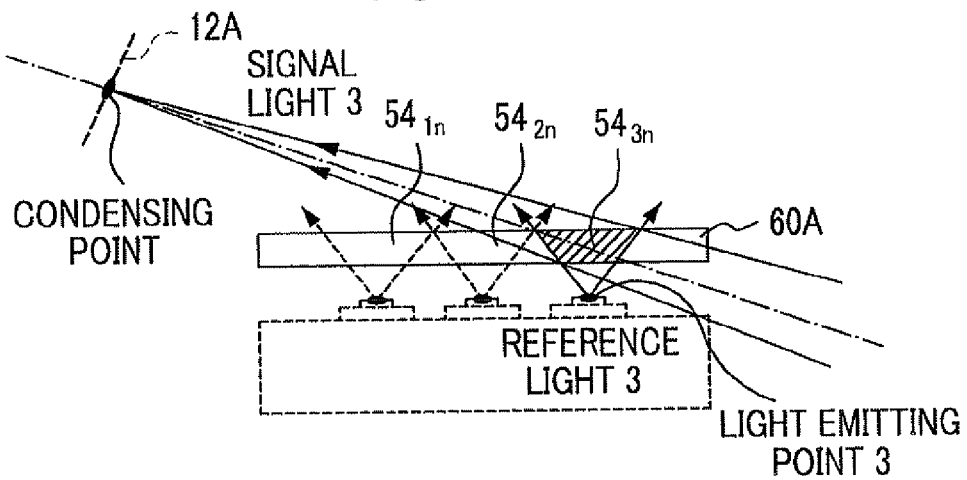

As shown in FIG. 4C, the coherent light that passes through the optical path of the diffraction light that is imaged on the condensing point on the surface 12A is irradiated to the hologram recording layer 60A as signal light 3. Simultaneously, when passing through the hologram recording layer 60A, the coherent light that passes through the optical path of the diffused light that is diffused from the light emitting point 3 to a desired hologram diameter $r_H$ is irradiated to the hologram recording layer 60A as reference light 3. A transmissive hologram element $54_{3n}$ is recorded by the interference between the signal light 3 and the reference light 3.

By performing recording as described above, the hologram recording layer 60 in which the hologram element $54_{1n}$, the hologram element $54_{2n}$, and the hologram element $54_{3n}$ are respectively recorded is acquired. The LPH 14 is fabricated by attaching this hologram recording layer 60 onto the LED substrate 58 on which the LED array 52 is mounted.

As shown in FIG. 5, signal light may be made common to the reference light 1, the reference light 2, and the reference light 3. That is, the coherent light that passes through the optical path of the diffraction light that is imaged on the condensing point on the surface 12A is irradiated to the hologram recording layer 60A as signal light. Simultaneously, when passing through the hologram recording layer 60A, the coherent light components that pass through the optical paths of the diffused light components that are diffused from the light emitting point 1, the light emitting point 2, and the light emitting point 3, respectively, to a desired hologram diameter $r_H$ are irradiated to the hologram recording layer 60A as the reference light 1, the reference light 2, and the reference light 3. The transmissive hologram element $54_{1n}$ is recorded by the interference between the signal light and the reference light 1, the transmissive hologram element $54_{2n}$ is recorded by the interference between the signal light and the reference light 2, and the transmissive hologram element $54_{3n}$ is recorded by the interference between the signal light and the reference light 3.

Additionally, holograms may be recorded by phase conjugation recording after the hologram recording layer 60A is attached onto the LED substrate 58 on which the LED array 52 is mounted. Since holograms are recorded in accordance with the positions of the LEDs 50 after the hologram recording layer 60A is attached, high positional precision becomes unnecessary as compared to a case where the hologram recording layer 60 is attached to the LED substrate 58 after recording. In the phase conjugation recording, the signal light and reference light that pass through the same optical paths as above are irradiated from the side where the LED substrate 58 or the like is not arranged, i.e., from the surface side of the hologram recording layer 60A. Even in this case, the transmissive hologram elements 54 are similarly formed in the hologram recording layer 60.

<Simultaneous Driving and Independent Driving>

Figure 6:
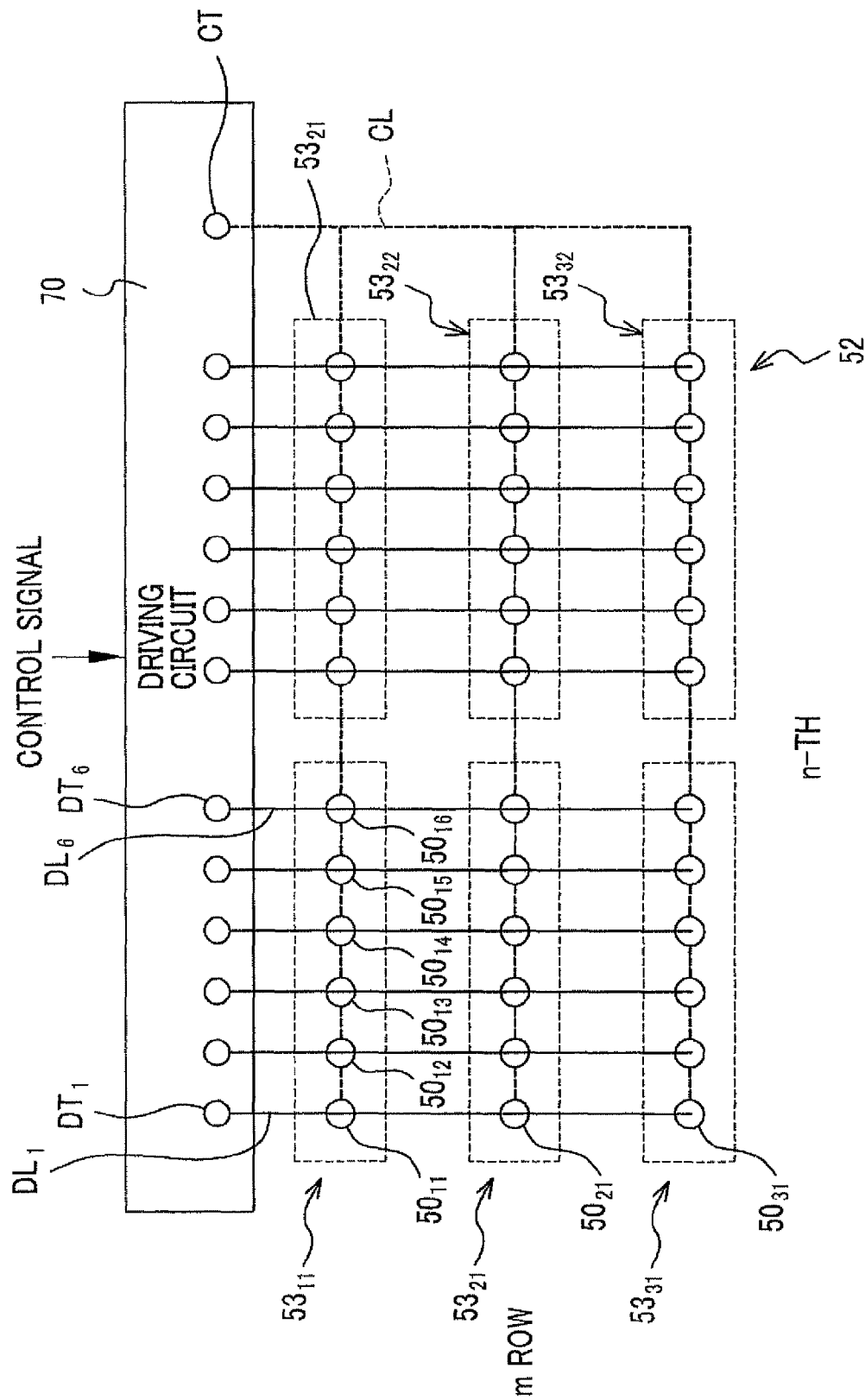
FIG. 6 is a plan view showing an example of wiring corresponding to simultaneous driving.

Next, a method of driving an LED array will be described. FIG. 6 is a plan view showing an example of wiring corresponding to simultaneous driving. FIG. 7 is a plan view showing an example of wiring corresponding to independent driving. The LPH 14 is equipped with the LED array 52 in which the plural LEDs 50 are two-dimensionally arranged. In the LED array 52, the LED chips 53 in which several (six in the drawing) LEDs 50 are arranged are divided into in rows (three rows in the drawing) in the slow scanning direction, and are arranged so as to be aligned as plural pieces (two in the drawings) in the fast scanning direction. Here, an n-th LED 50 in an m row is indicated as an "LED $50_{mn}$".

First, a case where plural LEDs 50 aligned in the slow scanning direction are simultaneously driven will be described with reference to FIG. 6. As shown in FIG. 6, as for all the LEDs 50, one-side electrodes (first electrodes) of pairs of electrodes of the LEDs 50 are connected to common wiring CL. A common terminal CT is provided at one end of the wiring CL. The first electrodes of the LEDs 50 are connected to a driving circuit 70 by the terminal CT.

Additionally, as for the LEDs 50 to be simultaneously driven, the other-side electrodes (second electrodes) of pairs of electrodes of the LEDs 50 are connected to signal wiring DL. In this example, the second electrodes of the n-th LEDs 50 in the respective rows are connected to the wiring $DL_n$. A terminal $DT_n$ is provided at one end of the wiring $DL_n$. The second electrodes of the LEDs 50 are respectively connected to the driving circuit 70 by the terminal $DT_n$. For example, the second electrodes of sixth LED $50_{16}$, LED $50_{26}$, and LED $50_{36}$ in the respective rows are respectively connected to wiring $DL_6$, and are connected to the driving circuit 70 by a terminal $DT_6$.

By applying a driving voltage to between the terminal CT and the terminal $DT_n$ by the driving circuit 70, the n-th LEDs 50 in the respective rows are simultaneously driven. That is, plural LEDs 50 aligned in the slow scanning direction are simultaneously driven to emit light. The driving circuit 70 may be configured such that any terminal $DT_n$ is selected, and an electric configuration is simplified.

Next, a case where plural LEDs 50 are independently driven will be described with reference to FIG. 7. As shown in FIG. 7, as for the LEDs 50 in an m row, the first electrodes of the LEDs 50 are connected to common wiring $CL_m$ for every row. A common terminal $CT_m$ is provided at one end of wiring $CL_m$. The first electrodes of the LEDs 50 are connected to the driving circuit 70 by the terminal $CT_m$, respectively. For example, the first electrodes of an LED $50_{11}$ to an LED $50_{12}$ in a first row are respectively connected to wiring $CL_1$, and connected to the driving circuit 70 by a terminal $CT_1$.

Additionally, the second electrodes of the n-th LEDs 50 in the respective rows are connected to the wiring $DL_n$. A terminal $DT_n$ is provided at one end of the wiring $DL_n$. The second electrodes of the LEDs 50 are connected to the driving circuit 70 by the terminal $DT_n$. For example, the second electrodes of sixth LED $50_{16}$, LED $50_{26}$, and LED $50_{36}$ in the respective rows are respectively connected to wiring $DL_6$, and are connected to the driving circuit 70 by a terminal $DT_6$.

By applying a driving voltage to between the terminal $CT_m$ and the terminal $DT_n$ by the driving circuit 70, the n-th LED $50_{mn}$ in the m row is driven. That is, each of the plural LEDs 50 is independently driven. Additionally, since all the LEDs 50 are independently driven, plural LEDs 50 aligned in the slow scanning direction are also independently driven.

In the present exemplary embodiment, plural LEDs 50 aligned in the slow scanning direction are used for forming one spot 62. Since plural LEDs 50 aligned in the slow scanning direction are independently driven, the quantity of exposure light and spot size may be changed by changing the number of LEDs 50 to be made to emit light, among the plural LEDs 50 aligned in the slow scanning direction. Plural grayscales are expressed by changes in the quantity of exposure light or spot size. When the number of LEDs 50 aligned in the slow scanning direction is defined as x, $2^x$ (x-th power of 2) grayscales are realized.

For example, a control signal for changing the number of LEDs 50 to be made to emit light for every condensing point is generated such that a desired quantity of exposure light and spot size are obtained according to image information. Then, the plural LEDs 50 are respectively driven by the driving circuit 70 on the basis of this control signal.

<Modification of LPH>

Although the example in which plural LEDs aligned in the slow scanning direction are used for forming one spot has been described in the above, plural LEDs aligned in the fast scanning direction may be used for forming one spot. FIG. 8 is a schematic perspective view showing another example of the configuration of an LED print head related to the exemplary embodiment of the invention. Since this LPH has the same configuration as the LPH shown in FIG. 2 except for using plural LEDs aligned in the fast scanning direction for forming one spot, the same constituent parts are designated by the same reference numerals, and the description thereof is omitted.

In the modification, as shown in FIG. 8, three LEDs 50 aligned in the fast scanning direction are used for forming one spot 62. For example, in the example shown in FIG. 8, respective light components emitted from an LED $50_{11}$, an LED $50_{12}$, and an LED $50_{13}$, respectively, are diffracted by any of corresponding hologram element $54_{11}$, hologram element $54_{12}$, and hologram element $54_{13}$, and are condensed in the direction of the photoreceptor drum 12, thereby forming one spot $62_1$.

The spot 62 formed by the three LEDs 50 has a quantity of light about 3 times that of the spot 62 formed by one LED 50. In proportion to the number of LEDs 50 that form one spot 62, the quantity of light is increased by 2 times, 3 times, 4 times, etc.

In a case where three LEDs 50 aligned in the fast scanning direction are used for forming one spot 62, the resolution is lowered to one third (⅓) as seen per row. However, the total number of LEDs and the number of LEDs to be used for forming one spot are the same as those of LPH shown in FIG. 2, and spots 62 of the same number are formed by other two rows. Accordingly, when aligned in the fast scanning direction, it is not necessary to reduce the number of spots 62, and the resolution is maintained.

Additionally, for example, LEDs 50 aligned obliquely may be selected such that respective light components emitted from an LED $50_{11}$, an LED $50_{22}$, and an LED $50_{33}$, respectively, are diffracted by any of corresponding hologram element $54_{11}$, hologram element $54_{22}$, and hologram element $54_{33}$, and are condensed in the direction of the photoreceptor drum 12, thereby forming one spot $62_1$. In this case, seams of the LED chip 53 in the fast scanning direction, and light emitting element variation that depends on the positions (n) of LEDs, such as the variation in quantity of light within the LED chip 53, can be ameliorated. From the same viewpoint, LEDs 50 may be selected at random from n-th LEDs 50 in respective rows.

<Other Modifications>

In addition, although the example equipped with the LED print head equipped with the plural LEDs has been described above, other light emitting elements, such as electroluminescent elements (EL) and laser diodes (LD) may be used instead of the LEDs. Even in a case where the hologram elements are designed according to the characteristics of the light emitting elements, and the unnecessary exposure caused by the incoherent light is prevented to thereby use the LEDs or ELs that emit incoherent light as the light emitting elements, minute spots with clear outlines are formed similarly to a case where the LDs that emit coherent light are used as the light emitting elements.

Additionally, although the example in which the plural hologram elements are multiplexing-recorded by the spherical wave shift multiplexing has been described in the above, the plural hologram elements may be multiplexing-recorded by other multiplexing systems as long as multiplexing systems in which desired diffraction light is obtained are used. Additionally, plural kinds of multiplexing systems may be combined together. The other multiplexing systems include angle multiplexing recording while changing the incident angle of reference light, wavelength multiplexing recording while changing the wavelength of reference light, and phase multiplexing recording while changing the phase of reference light.

Additionally, although the image forming apparatus that is a tandem digital color printer, and the LED print head serving as an exposure device that exposes the photoreceptor drum of each image forming unit have been described in the above, an image forming apparatus in which an image is formed by performing imagewise exposure of a photosensitive image recording medium by an exposure device may be used. The invention is not limited to the above application example. For example, the image forming apparatus is not limited to the digital color printer of an electrophotographic system. The exposure device of the invention may be mounted on writing apparatuses, such as an image forming apparatus of a silver salt system and optical writing type electronic paper. Additionally, the photosensitive image recording medium is not limited to the photoreceptor drum. The exposure device related to the above application may also be applied to exposure of a sheet-like photoreceptor or photosensitive material, a photoresist, a photopolymer, and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An exposure device comprising:
a plurality of light emitting elements provided on a substrate;
a plurality of hologram elements being two-dimensionally arranged and multiplexing-recorded in correspondence with the plurality of light emitting elements, respectively, such that, when the plurality of light emitting elements are made to emit light in a recording layer arranged on the substrate, a plurality of condensing points having light components emitted from two or more light emitting elements and condensed on one point, is formed, and a condensing point row is formed that extends in a predetermined direction on the face to be exposed; and
a driving unit that drives the plurality of light emitting elements, respectively,
wherein the hologram elements overlap each other in a first direction but do not overlap each other in a second direction substantially perpendicular to the first direction.

2. The exposure device according to claim 1,
wherein two or more light emitting elements that form one condensing point are set to have a predetermined number.

3. The exposure device according to claim 2,
wherein the plurality of light emitting elements is two-dimensionally arranged.

4. The exposure device according to claim 3, further comprising a control unit that controls the driving unit on the basis of image data so as to change the number of the light emitting elements to be made to emit light among two or more light emitting elements that form one condensing point, on the basis of image data.

5. The exposure device according to claim 2, further comprising a control unit that controls the driving unit on the basis of image data so as to change the number of the light emitting elements to be made to emit light among two or more light emitting elements that form one condensing point, on the basis of image data.

6. An image forming apparatus comprising:
the exposure device according to claim 2; and
a photoreceptor arranged so as to be separated from the exposure device by an operating distance and subjected to scanning and exposure according to image data by the exposure device such that an image is written thereon.

7. The exposure device according to claim 1,
wherein the plurality of light emitting elements is two-dimensionally arranged.

8. The exposure device according to claim 7, further comprising a control unit that controls the driving unit on the basis of image data so as to change the number of the light emitting elements to be made to emit light among two or more light emitting elements that form one condensing point, on the basis of image data.

9. The exposure device according to claim 1, further comprising a control unit that controls the driving unit, so as to change the number of the light emitting elements to be made to emit light among two or more light emitting elements that form one condensing point, on the basis of image data.

10. An image forming apparatus comprising:
the exposure device according to claim 1; and
a photoreceptor arranged so as to be separated from the exposure device by an operating distance and subjected to scanning and exposure according to image data by the exposure device such that an image is written thereon.

11. An exposure device comprising:
a plurality of light emitting elements provided on a substrate;
a plurality of hologram elements multiplexing-recorded in correspondence with the plurality of light emitting elements, respectively, such that, when the plurality of light emitting elements are made to emit light in the recording layer arranged on the substrate, a plurality of condensing points having light components emitted from two or more light emitting elements and condensed on one point, is formed, and a condensing point row is formed that extends in a predetermined direction on the face to be exposed, the hologram elements overlapping each other in a first direction but not overlapping each other in a second direction substantially perpendicular to the first direction; and
a driving unit that drives the plurality of light emitting elements, respectively.

* * * * *